US010075922B2

(12) United States Patent
Haro et al.

(10) Patent No.: US 10,075,922 B2
(45) Date of Patent: *Sep. 11, 2018

(54) APPARATUS AND METHOD FOR CONSERVATION OF BATTERY POWER OF MOBILE DEVICES WITHIN A LOCATION-BASED GROUP

(71) Applicant: Life360, Inc., San Francisco, CA (US)

(72) Inventors: Alexander Haro, San Francisco, CA (US); Christopher Hulls, Point Reyes, CA (US); Michael Borsuk, San Francisco, CA (US); Michael Hood, San Francisco, CA (US)

(73) Assignee: Life360, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/642,237

(22) Filed: Jul. 5, 2017

(65) Prior Publication Data
US 2017/0303203 A1    Oct. 19, 2017

Related U.S. Application Data

(63) Continuation of application No. 14/011,433, filed on Aug. 27, 2013, now Pat. No. 9,730,163.

(51) Int. Cl.
*H04W 4/02* (2018.01)
*H04M 1/66* (2006.01)
(Continued)

(52) U.S. Cl.
CPC ... *H04W 52/0274* (2013.01); *H04W 52/0277* (2013.01); *H04W 52/0254* (2013.01);
(Continued)

(58) Field of Classification Search
CPC ......... H04W 52/0274; H04W 52/0277; H04W 52/0254; H04W 52/0258; H04W 12/08;
(Continued)

(56) References Cited

U.S. PATENT DOCUMENTS

5,550,454 A   8/1996  Buckley
5,590,396 A   12/1996 Henry
(Continued)

*Primary Examiner* — Edan Orgad
*Assistant Examiner* — Vanneilian Lalchinthang
(74) *Attorney, Agent, or Firm* — Womble Bond Dickinson (US) LLP (57) ABSTRACT

A method of conserving battery power of mobile devices within a location-based group starts with server receiving location data and proximity information from each of the mobile devices. Location data received from first mobile device includes the first mobile device's location. Proximity information received from first mobile device includes an identification of mobile devices within a predetermined radius of first mobile device's location. Server identifies based on location data and proximity information a specific location and forms a subgroup of mobile devices that are within a predetermined radius of the specific location. Server queries and receives a level of power associated with each mobile devices in the subgroup and transmits control signals to each mobile devices in the subgroup to shut down radio functions based on the level of power. Other embodiments are also described.

22 Claims, 6 Drawing Sheets

(51) Int. Cl.
*H04W 24/00* (2009.01)
*H04W 52/02* (2009.01)

(52) U.S. Cl.
CPC ......... *H04W 52/0258* (2013.01); *Y02D 70/00* (2018.01); *Y02D 70/1262* (2018.01); *Y02D 70/142* (2018.01); *Y02D 70/144* (2018.01); *Y02D 70/164* (2018.01); *Y02D 70/26* (2018.01)

(58) Field of Classification Search
CPC .... H04W 8/245; Y02B 60/05; H04L 2209/80; H04M 1/72569; H04M 1/72572; H04M 2250/10
USPC .......................................................... 370/311
See application file for complete search history.

(56) References Cited

U.S. PATENT DOCUMENTS

| | | | |
|---|---|---|---|
| 6,317,593 B1 | 11/2001 | Vossler | |
| 6,337,560 B1 | 1/2002 | Kalogeropoulos et al. | |
| 7,394,224 B2 | 7/2008 | Wanibuchi et al. | |
| 7,496,060 B2 | 2/2009 | Ramirez et al. | |
| 7,505,795 B1 | 3/2009 | Lim et al. | |
| 8,059,570 B2 | 11/2011 | Albert et al. | |
| 8,060,154 B1 | 11/2011 | Bali et al. | |
| 8,155,625 B2 | 4/2012 | Morgan | |
| 8,255,716 B2 | 8/2012 | Mandyam | |
| 8,666,373 B2 | 3/2014 | Dessouky et al. | |
| 2008/0009264 A1* | 1/2008 | Brown | G06F 21/305 455/410 |
| 2008/0049653 A1* | 2/2008 | Demirhan | H04Q 9/00 370/311 |
| 2008/0057894 A1* | 3/2008 | Aleksic | H02J 9/002 455/187.1 |
| 2008/0133336 A1* | 6/2008 | Altman | G06Q 30/0207 455/456.1 |
| 2009/0201850 A1* | 8/2009 | Davis | G01S 5/0009 370/328 |
| 2010/0027426 A1* | 2/2010 | Nair | H04W 28/16 370/238 |
| 2010/0162021 A1 | 6/2010 | Kennard et al. | |
| 2011/0086664 A1* | 4/2011 | Li | H04W 52/241 455/522 |
| 2011/0312355 A1* | 12/2011 | Cheng | G01S 5/0215 455/501 |
| 2012/0194382 A1 | 8/2012 | Anderson et al. | |
| 2012/0210150 A1 | 8/2012 | de Lind van Wijngaarden et al. | |
| 2013/0089015 A1 | 4/2013 | Choong | |
| 2013/0288718 A1* | 10/2013 | MacGougan | H04W 52/0254 455/456.4 |

\* cited by examiner

APPARATUS AND METHOD FOR CONSERVATION OF BATTERY POWER OF MOBILE DEVICES WITHIN A LOCATION-BASED GROUP

CROSS-REFERENCE TO RELATED APPLICATIONS

This present application is a continuation of U.S. patent application Ser. No. 14/011,433, filed on Aug. 27, 2013, which is incorporated herein by reference in its entirety.

FIELD

Embodiments of the invention relate generally to an apparatus and method of conserving the battery power of mobile devices within a location-based group.

BACKGROUND

Currently, smart mobile phones and other mobile devices are notorious for the speed with which batteries run down. One of the main causes of the rapid depletion of the battery charges of mobile devices is constant data transfer via wireless connections such as Wi-Fi, Bluetooth, 3G or 4G and GPS. Further, when using Wi-Fi, Bluetooth and GPS, the radios on the mobile device are constantly listening for signals and hence, using up the battery of the mobile devices.

Moreover, some of the applications running on the mobile device triangulate the mobile device's location on the Earth's surface. These applications access the mobile device's position to provide services including finding nearby restaurants, "checking-in" on social networks and for satellite navigation. In order to refine the location of the mobile devices, these applications continuously use the capabilities of the mobile device including some of additional sensors included in the mobile devices such as accelerometer and proximity sensor etc. The continuous sensing and refinement activity also keeps the radios continuously running in the background, which further depletes the battery of the mobile device.

BRIEF DESCRIPTION OF THE DRAWINGS

The embodiments of the invention are illustrated by way of example and not by way of limitation in the figures of the accompanying drawings in which like references indicate similar elements. It should be noted that references to "an" or "one" embodiment of the invention in this disclosure are not necessarily to the same embodiment, and they mean at least one. In the drawings.

DETAILED DESCRIPTION

In the following description, numerous specific details are set forth. However, it is understood that embodiments of the invention may be practiced without these specific details. In other instances, well-known circuits, structures, and techniques have not been shown to avoid obscuring the understanding of this description.

In the description, certain terminology is used to describe features of the invention. For example, in certain situations, the terms "component," "unit," "module," and "logic" are representative of hardware and/or software configured to perform one or more functions. For instance, examples of "hardware" include, but are not limited or restricted to an integrated circuit such as a processor (e.g., a digital signal processor, microprocessor, application specific integrated circuit, a micro-controller, etc.). Of course, the hardware may be alternatively implemented as a finite state machine or even combinatorial logic. An example of "software" includes executable code in the form of an application, an applet, a routine or even a series of instructions. The software may be stored in any type of machine-readable medium.

Figure 1:
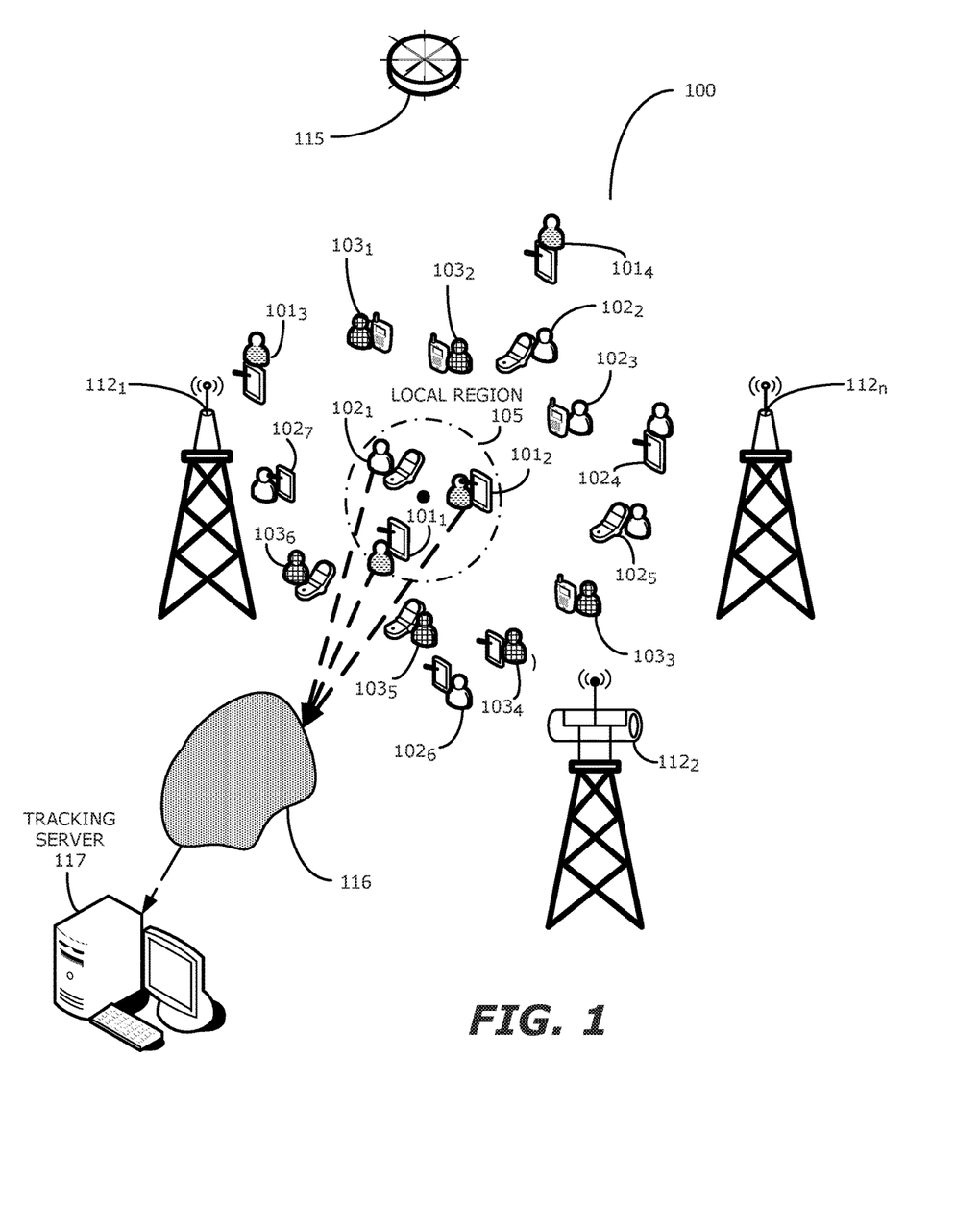
FIG. 1 illustrates a prior art system for fixing and tracking the location of mobile devices.

FIG. 1 illustrates a prior art system for tracking the location of mobile devices. The system 100 illustrates a plurality of mobile devices $101_1$-$101_m$ (m>1), $102_1$-$102_p$ (p>1), $103_1$-$103_q$ (q>1). The mobile devices may be portable computers such as laptop, notebook, tablet, and handheld computers or may also take the form of other types of devices, such as mobile telephones, media players, personal data organizers, handheld game platforms, cameras, and/or combinations of such devices. The mobile devices may be combined in groups that are explicitly registered and linked with a server 117 that tracks the location of the mobile devices. For instance, in FIG. 1, the mobile devices $101_1$-$101_m$ (m>1) may be an explicit group 101, the mobile devices $102_1$-$102_p$ (p>1) may be an explicit group 102 and the mobile devices $101_1$-$101_m$ (m>1) may be an explicit group 103. In one embodiment, the explicit group 101 may include the mobile devices 1011-101m that are members of a social networking group that are being tracked by their location. For instance, the membership to these social networks include registration with one or more central servers as part of explicit groups, such as family group, friends group, extended family and friends group, sport and club groups etc. Moreover, the combinations of these explicit groups 101, 102, 103 also form implicit groups of mobile devices that have common properties but are not linked by an explicit registration for tracking. For instance, implicit groups include all registered devices, all members of a club, etc.

The tracking server 117 included in the system 100 links to each of the registered mobile devices over a network 116 (e.g., Internet) to collect and transfer location data. Specifically, the server 117 requests location data from each of the mobile devices. The mobile devices may fix their location and transmit their location data using their sensors and radios via the Global Positioning System (GPS) 115 or WiFi stations $112_1$-$112_n$ (n>1). The server 117 then obtains the location data from each of the mobile devices $101_1$-$101_m$, $102_1$-$102_p$, $103_1$-$103_q$, over the network 116 (via at least one of WiFi, cell towers and satellite connections based on availability), and transmits this location data from each of the mobile devices to the mobile devices in their respective explicit groups. In one embodiment, the server 117 transmits the location data from the mobile device $101_1$ to the mobile devices $101_2$-$101_m$.

Figure 2:
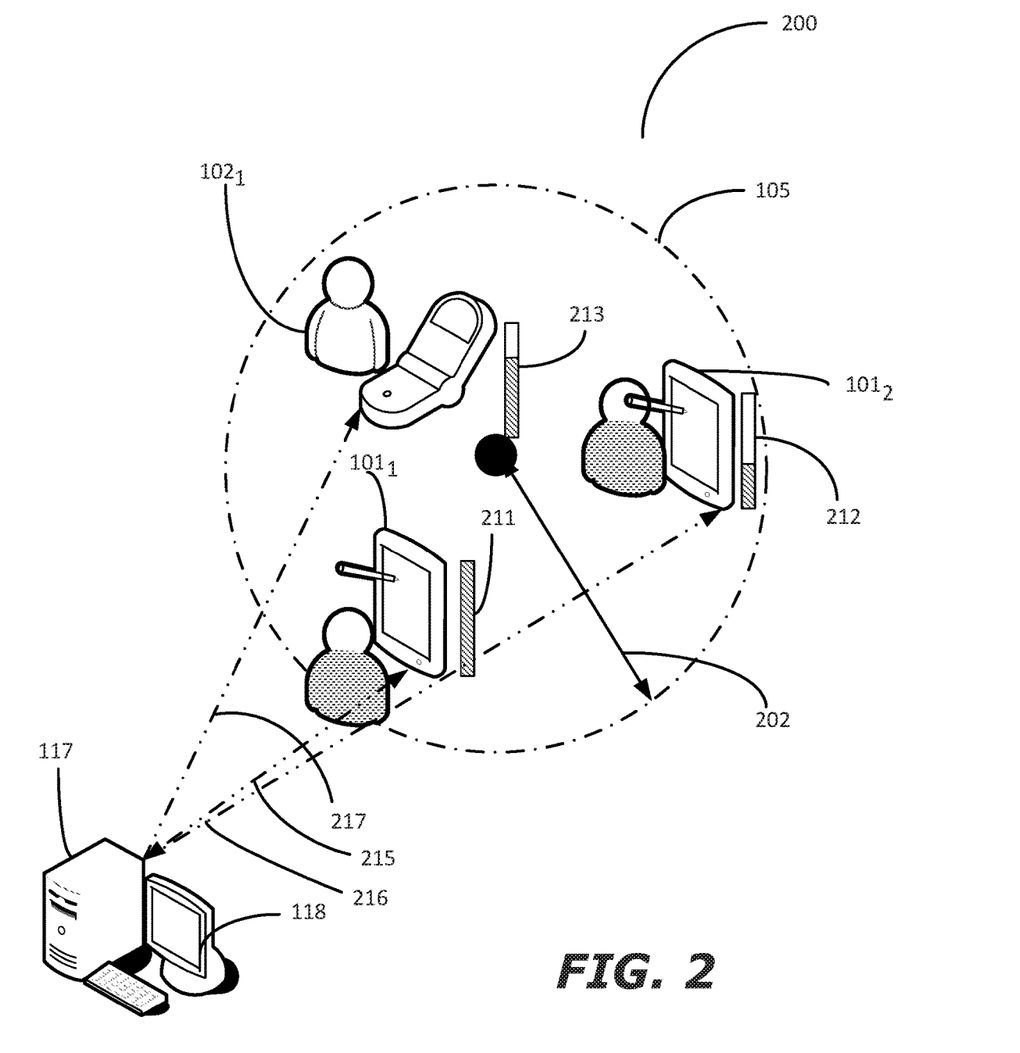
FIG. 2 illustrates the details of the prior art system for tracking the location of mobile devices.

FIG. 2 illustrates the details of the prior art system 101 for tracking the location of mobile devices. Specifically, FIG. 2 is an expanded view of a region 105 of FIG. 1, and illustrates the connectivity of the mobile devices within the specific region 105. As shown in FIG. 2, the mobile devices at a location 105 include mobile devices $101_1$, $101_2$ and $102_1$ that each extract their location data upon receiving a request from the tracking server 117, by connecting to the GPS 115 or by triangulation using the WiFi towers $112_1$-$112_n$ using the mobile devices' built-in radios. The location data from mobile devices $101_1$, $101_2$ and $102_1$ is generated and transmitted to the tracking server 117 over the network 116.

In FIG. 2, the mobile device $101_1$ transmits to the server 117 via an Internet link 215, the mobile device $101_2$ via Internet link 216 and $102_1$ via Internet link 217. Accordingly, in order to perform location fixing for each of the mobile devices, the radios on each of the mobile devices are continuously active and connecting to the GPS 115 or the WiFi towers $112_1$-$112_n$ as well as to the tracking server 117 via Internet via links 215, 216 and 217. Given the continuous use of the plurality of radios on each of the mobile devices $101_1$, $101_2$, $102_1$ to report that they are located at region 105, the battery charge on each of the mobile devices depletes rapidly. Further, this continuous use of the radios on each of the mobile devices does not take into account the power level (e.g., the current available charge on each mobile device's battery). As shown in FIG. 2, for example, the power level 211 of mobile device $101_1$ is the highest, then the power level 213 of mobile device $102_1$ is the second highest and power level 212 of mobile device $101_2$ is the lowest. Thus, while mobile devices $101_1$, $101_2$, $102_1$ are located within a radius 202 of a specific location (center of location 105) such that they can each report that they are located the same location, the prior art system does not allow for optimization of battery usage by these mobile devices for location fixing applications that use the radios and thus, the system 100 cannot conserve the battery of mobile devices within a group of mobile devices located within the same region 105, which may include mobile devices that have a low battery charge.

Figure 3:
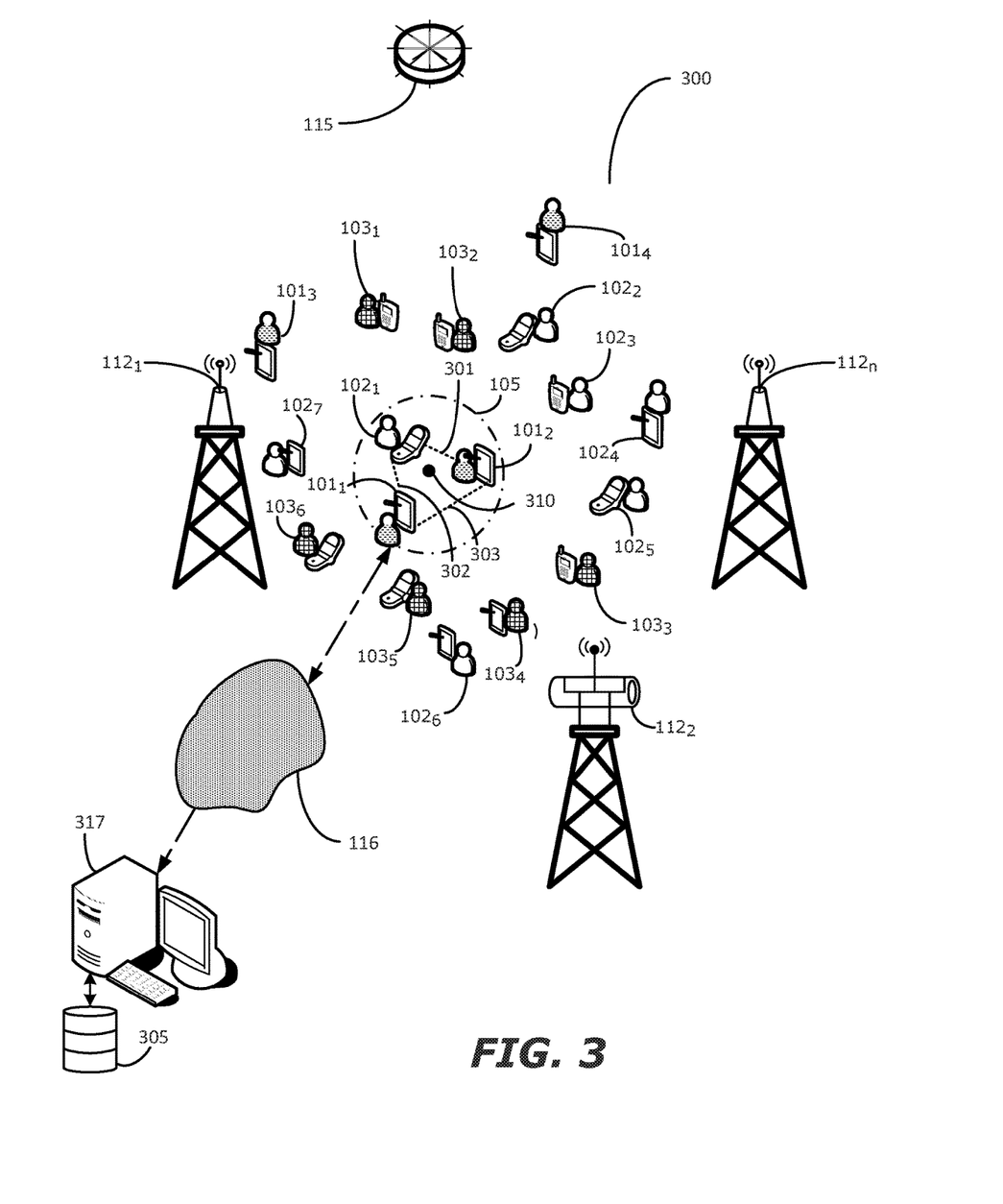
FIG. 3 illustrates a system for conserving the battery power of mobile devices within a location-based group according to an embodiment of the invention.

FIG. 3 illustrates a system for conserving the battery power of mobile devices within a location-based group according to an embodiment of the invention. Similar to system 100, the system 300 includes the plurality of mobile devices $101_1$-$101_m$ (m>1), $102_1$-$102_p$ (p>1), $103_1$-$103_q$ (q>1). The mobile devices may be combined in groups that are explicitly registered and linked with a server 317 that tracks the location of the mobile devices. The mobile devices $101_1$-$101_m$ (m>1) may be an explicit group 101, the mobile devices $102_1$-$102_p$ (p>1) may be an explicit group 102 and the mobile devices $103_1$-$103_m$ (m>1) may be an explicit group 103. In one embodiment, the explicit group 101 may include the mobile devices $101_1$-$101_m$ that are members of a social networking group that are being tracked by their location. Moreover, the combinations of these explicit groups 101, 102, 103 also form implicit groups of mobile devices that have common properties but are not linked by an explicit registration for tracking.

Similar to FIG. 1, the tracking server 317 included in the system 300 also links to each of the registered mobile devices over a network 116 (e.g., Internet) to collect and transfer location data. Specifically, the server 317 may request location data from each of the mobile devices. The mobile devices may fix their location and transmit their location data using their sensors and radios via the Global Positioning System (GPS) 115 or WiFi stations $112_1$-$112_n$ (n>1). The server 317 then obtains the location data from each of the mobile devices $101_1$-$101_m$, $102_1$-$102_p$, $103_1$-$103_q$, over the network 116 (via at least one of satellite, WiFi and cell connections based on availability), and transmits this location data from each of the mobile devices to the mobile devices in their respective explicit groups. In one embodiment, the server 117 transmits the location data from the mobile device $101_1$ to the mobile devices $101_2$-$101_m$.

However, contrary to the server 117, the server 317 may identify mobile devices that are located at location 310 or within a radius 202 of location 310 (e.g., the mobile devices within region 105) to perform an optimization of the battery usage of these mobile devices. The server 317 according to one embodiment of the invention uses the proximity sensing capability of the mobile devices to form subgroups. The mobile devices within the subgroups may be explicit or implicit registered members. In order to avoid the situation where mobile devices within a same region 105 are each continuously using their radio to provide the same current location 310 to the server 317, the server 317 may form subgroups based on an identifiable location or neighborhood. Accordingly, the server 317 may selectively use the subgroup as a unit to reduce and optimize the battery use within each subgroup for location fixing and identification. For example, in FIG. 3, the server 317 may identify a subgroup of mobile devices $101_1$, $101_2$, and $102_1$ as being in proximity at a location 310 and thus, form this subgroup. In some embodiments, the server 317 receives location data from each of mobile devices and identifies that the mobile devices $101_1$, $101_2$, $102_1$ are within a radius of 202 from the location 310. The server 317 may confirm the mobile devices' location 310 (or within the region 105) by querying the mobile devices for the proximity information. For instance, the proximity information received from the mobile device $101_1$ includes an identification of mobile devices $101_2$ and $102_1$ that are within a predetermined radius of the location of the mobile device $101_1$. Accordingly, the server 317 can confirm that mobile devices $101_1$, $101_2$, $102_1$ are within a radius 202 from the location 310. Using this confirmation, the server 317 may form a subgroup of mobile devices $101_1$, $101_2$, $102_1$.

Figure 4:
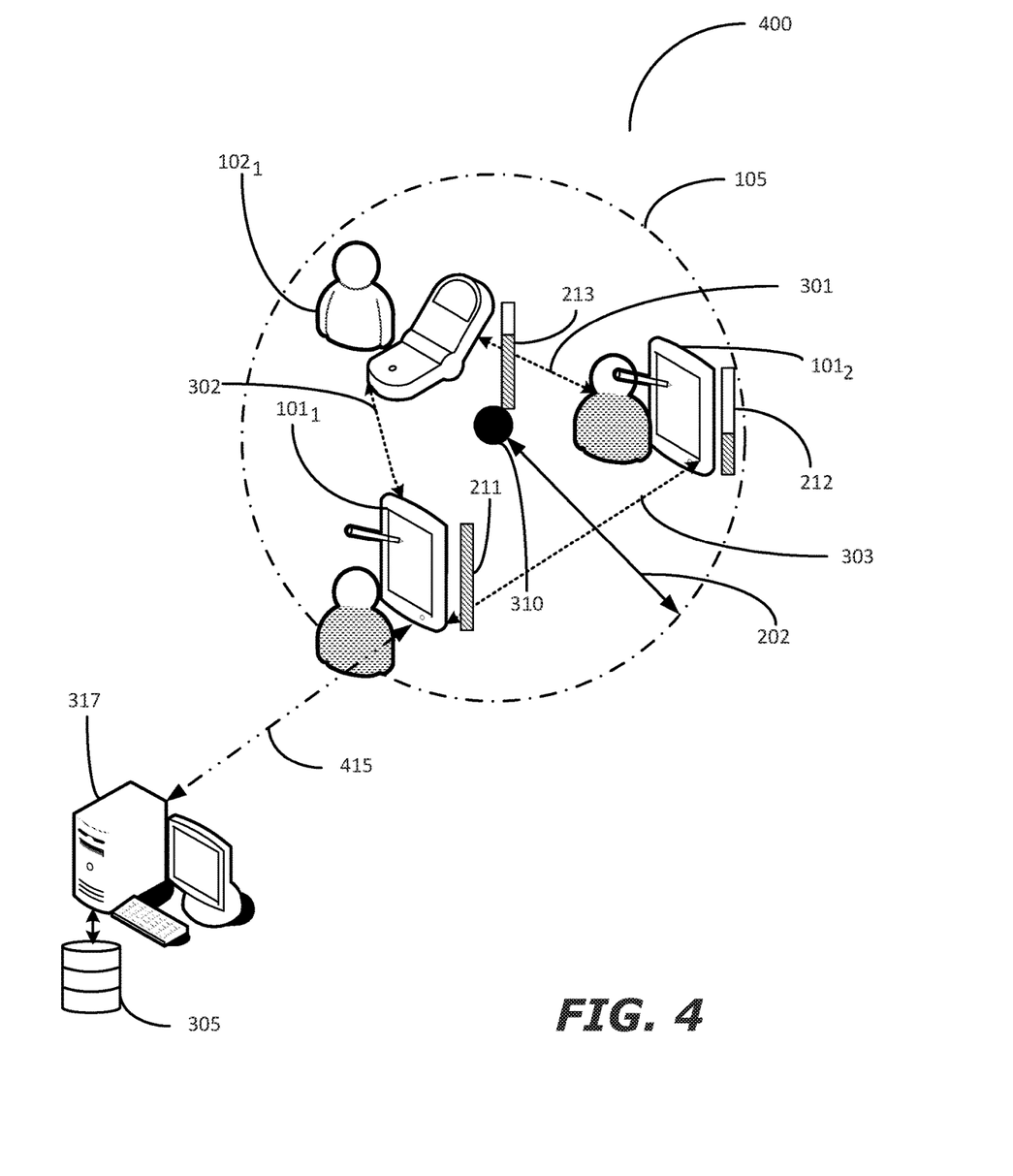
FIG. 4 illustrates the details of the system for conserving the battery power of mobile devices within a location-based group according to one embodiment of the invention.

FIG. 4 illustrates the details of the system 300 for conserving the battery power of mobile devices within a location-based group according to one embodiment of the invention. Specifically, FIG. 4 is an expanded view of the subgroup of mobile devices within region 105 of FIG. 3, and illustrates the connectivity of the mobile devices within the region 105. As discussed above, the mobile devices $101_1$, $101_2$, $102_1$ use their built-in proximity sensors to identify neighboring devices and thus, confirm that the mobile devices $101_1$, $101_2$, $102_1$ are within a radius 202 from the location 310. As shown in FIG. 4, for example, mobile devices $101_1$ and $102_1$ identify each other as being in proximity 302, mobile devices $101_1$ and $101_2$ identify each other as being in proximity 303, and mobile devices $101_1$ and $102_1$ identify each other as being in proximity 301. The proximity information is then transmitted to the server 117, which confirms that mobile devices $101_1$, $101_2$, $102_1$ are at the specific location 310 and defined as the subgroup 105 of the registered users at the location 310.

In some embodiments, the server 317 may determine whether the specific location 310 is included in the server 317's database 230 to confirm that the specific location is associated with at least one mobile device in the subgroup of mobile devices $101_1$, $101_2$, $102_1$ and may update the database to associate the specific location 310 with each of the mobile devices $101_1$, $101_2$, $102_1$ in the subgroup of mobile devices. More specifically, the historic data regarding each of the mobile devices $101_1$, $101_2$, and $102_1$ in the subgroup frequenting the location 310 may be collected by the server 317 which stores the historic data in a database memory 305. This historic information may thus be checked to identify and confirm the location 310 as being associated with at least one of the mobile devices in subgroup 105. The location 310 may be a location where members of the explicit and implicit groups congregate such as, for instance, clubs, schools, colleges, places of worship, sport facilities etc. As shown in FIG. 4, the subgroup may include registered members from both explicit and implicit members that assemble at the location 310. Though the subgroup in FIG. 4 is shown to include different mobile users, it is understood that the subgroup may be formed of multiple mobile devices belonging to a single user (e.g., tablet computers, mobile phones, smart watches etc.) which will typically be in a single identified location 310 in conjunction with other mobile devices identified by the proximity sensors of the mobile devices.

In one embodiment, once the location 310 and the subgroup is identified and confirmed, the server 317 queries the mobile devices $101_1$, $101_2$, and $102_1$ of the subgroup for their characteristics and the power levels 211, 213 and 212 associated with each of the mobile devices $101_1$, $101_2$, and $102_1$. Based on the power levels 211, 212, 213 received, the server 317 determines which of the mobile devices $101_1$, $101_2$, and $102_1$ is to shut down its radio function and the length of time of the shut down. Further, the server 317 may transmit control signals to each of the mobile devices $101_1$, $101_2$, and $102_1$ in the subgroup to shut down radio functions based on the level of power. In this embodiment, the mobile devices shut down of the radio functions by disconnecting the radio of the mobile device from the server 317 such that the radio of mobile device is not continuously active to provide location data and proximity information to the server 317.

In one embodiment of the invention, the server 317 enables the radio of the mobile device $101_1$ which has the highest power level 211 to be used to track the location 310 of the members $101_1$, $101_2$, and $102_1$ of the subgroup while also keeping track of the subgroup 105 using the proximity sensors on mobile device $101_1$. The radio functions of the other two other mobile devices $101_2$ and $102_1$ in this embodiment are disconnected from location-based usage to conserve available battery charge. In this embodiment, the mobile device $101_1$ performs the location fixing and communicates with the server 317 for a predefined period of time to ensure that the location of the devices in the subgroup 105 during that period of time is known to the server 317. In another embodiment, the reporting of the location to the server 317 is divided based on charge availability of the mobile devices. For instance, with the mobile devices $101_1$, $102_1$ and $101_2$ having respective power levels 211, 213 and 212, the radios on the mobile devices $101_1$, $102_1$ and $101_2$ are activated for time periods proportionally with a ratio of 211:213:212. The mobile device that is active is enabled to provide location identification to the server 317 and proximity check of the other two devices for a predefined period of time. In another embodiment, to conserve charge of mobile device $101_2$ that has a very low power level 212, the radio of the mobile device $101_2$ with the low power level 212 is eliminated from use for location fixing and server 317 contact. In this embodiment, the mobile device $101_2$ is excluded from radio usage, while the other two mobile devices $101_1$ and $102_1$ are activate and used in a proportionate manner 211:213 for location fixing and contact with server 117 for a predefined period of time.

Further, for the mobile devices such as smart watches that indicate high charge level but have low power capability and require long life, the server 317 may assess the characteristics of the mobile devices received to avoid or sparingly use such mobile devices for location identification and contact to server 317. In this embodiment, the server 317 may query and receive characteristics associated with each of the mobile devices in the subgroup, identify mobile devices based on the characteristics received that have low power capability, and signal to the identified mobile devices to shut down their radio functions. This embodiment may be also used in addition to the methods described above.

Figure 6:
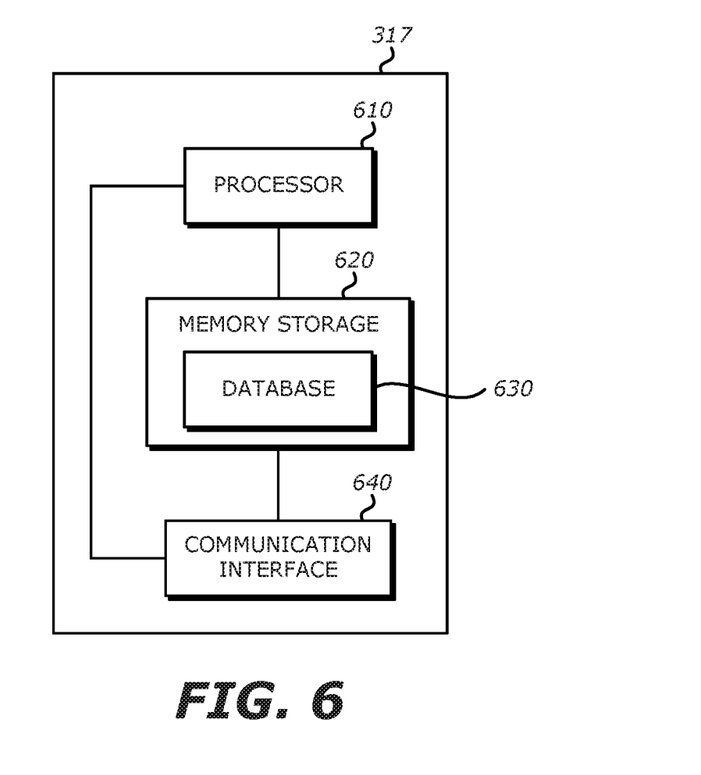
FIG. 6 illustrates exemplary components of a server in accordance with aspects of the present disclosure.

Referring to FIG. 6, which illustrates exemplary components of a server 317 in accordance with aspects of the present disclosure, the server 317 may include a processor 610, memory storage 620, and a communication interface 640.

The communication interface 640 is be a network communication interface that may include a wired network interface such as an IEEE 802.3 Ethernet interface as well as a wireless interface such as an IEEE 802.11 WiFi interface. Data may also be received from any one of a variety of different wireless communications networks and in accordance with any one of several different protocols. These include: a cellular mobile phone network (e.g. a Global System for Mobile communications, GSM, network), including current 2G, 3G, 4G, and LTE networks; and an IEEE 802.11 network (WiFi or Wireless Local Area Network, WLAN). In one embodiment, the communication interface 640 may receive location data and proximity information from each of the mobile devices, respectively. The location data received from a mobile device $101_1$ may include the location 310 which is the current location of the mobile device $101_1$. The proximity information received from the mobile device $101_1$ may include an identification of mobile devices proximate in location to the mobile device $101_1$. For instance, the mobile device $101_1$ may provide the identification of mobile devices $101_2$ and $102_1$ that are within a predetermined radius 202 of the location 310 of the mobile device $101_1$. The communication interface 640 may also transmit queries based on signals received from the processor 610. For instance, the communication interface 640 may transmit a query to each of the mobile devices in a subgroup including $101_1$, $101_2$, and $102_1$ and receive a level of power associated with each of the mobile devices in the subgroup in response to the query. The communication interface may also transmit control signals to each of the mobile devices in the subgroup based on signals received from the processor 610.

The processor 610 that is coupled to the communication interface 640 may include a microprocessor, a microcontroller, a digital signal processor, or a central processing unit, and other needed integrated circuits such as glue logic. The term "processor" may refer to a device having two or more processing units or elements, e.g. a CPU with multiple processing cores. The processor 640 may be used to control the operations of the communication interface 640. For example, the processor 640 may be coupled to the communication interface 640 and executes software to control the wireless network communications functionality of the server 317 (e.g. communicating with a network 116 to transmit and receive data to other components of system 300 (e.g., mobile devices) via the communication interface 640). In some cases, a particular function may be implemented as two or more pieces of software that are being executed by different hardware units of a processor.

In one embodiment, the processor 610 is also coupled to the memory storage 620 that may include one or more different types of storage such as hard disk drive storage, nonvolatile memory, and volatile memory such as dynamic random access memory. The memory storage 620 may also include a database 630 that stores historical data including location data associated with a plurality of mobile devices. The database 630 may also store membership data in explicit or implicit groups, member or mobile device characteristics, location identification, other location related information, historical subgroup member data and location based subgroup data. The memory device 620 may also store instructions (e.g. software; firmware) which may be executed by the processor 610. In one embodiment, when the instructions stored in memory device 620 are executed by the processor 610, the processor 610 performs methods for conserving the battery power of mobile devices within a location-based group. In some embodiments, the processor 610 may receive the location data and the proximity information from the communication interface, identify a specific location based on the location data and the proximity information, and form the subgroup of mobile devices that include mobile devices within a predetermined radius of the specific location. The processor 610 may also control the functions of the communication interface 640 by signaling to the communication interface 640 to send the queries and to transmit the control signals to each of the mobile devices $101_1$, $101_2$, and $102_1$ in the subgroup to shut down radio functions based on the level of power. The processor 610 may also receive the level of power associated with each of the mobile devices $101_1$, $101_2$, and $102_1$ in the subgroup from the communication interface 640. The methods for conserving the battery power of the mobile devices within a location-based group are discussed in further detail below.

In addition, various other peripheral units (not shown) may be connected to the server 317 to form a computer platform, such as but not limited to keyboards, mouse, additional data storage units, printing units and/or display units. The processor 610, memory storage 620, and communication interface 640 communicate to input devices and output devices via one or more communication links such as a bus. The communication links may also be other wired or wireless communication links. Though in FIG. 3, a single server 317 is shown, it is understood that the server 317 may be a virtual machine, with all the above capabilities, distributed over multiple servers or the cloud computing.

The following embodiments of the invention may be described as a process, which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a procedure, etc.

Figure 5:
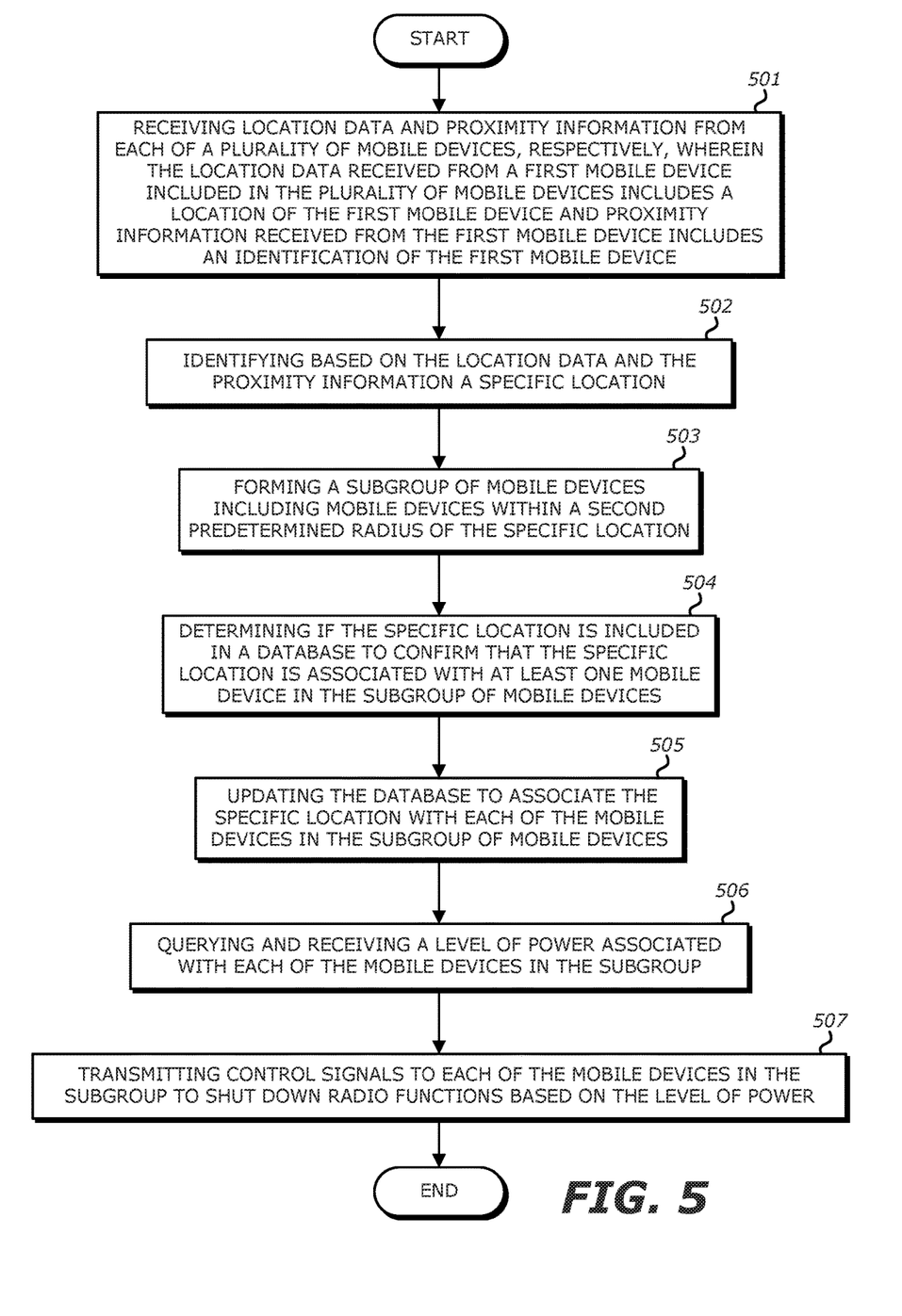
FIG. 5 illustrates a flow diagram of an example method of conserving the battery power of mobile devices within a location-based group according to an embodiment of the invention.

FIG. 5 illustrates a flow diagram of an example method of conserving the battery power of mobile devices within a location-based group according to an embodiment of the invention. The method 500 starts at Block 501 with the server receiving location data and proximity information from each of a plurality of mobile devices, respectively. The location data received from a first mobile device $101_1$ included in the plurality of mobile devices includes a location of the first mobile device $101_1$ and the proximity information received from the first mobile device $101_1$ includes an identification of mobile devices (e.g., mobile devices $101_2$, $102_1$) that are within a first predetermined radius of the location of the first mobile device $101_1$. At Block 502, the server may identify a specific location based on the location data and the proximity information and at Block 503, the server may form a subgroup of mobile devices including mobile devices within a second predetermined radius of the specific location. At Block 504, the server may determine if the specific location is included in a database included in the server to confirm that the specific location is associated with at least one mobile device in the subgroup of mobile devices and at Block 505, the database is updated to associate the specific location with each of the mobile devices in the subgroup of mobile devices. At Block 506, the server queries and receives a level of power associated with each of the mobile devices in the subgroup and at Block 507, the server transmits control signals to each of the mobile devices in the subgroup to shut down radio functions based on the level of power.

In one embodiment, the server may signal to each of the mobile devices in subgroup to shut down radio functions inversely proportionally to the level of power associated with each of the mobile devices in the subgroup. Accordingly, the radio functions that are used to provide location data and proximity information to the server are being disabled at a rate that is inversely proportional to level of power associated with a mobile device. In that matter, the mobile device having the least amount of battery power deactivates its radio functions for the longest period of time. In another embodiment, the server may select, based on the level of power, one of the mobile devices in the subgroup as a first selected mobile device and signaling to the mobile devices in the subgroup other than the first selected mobile device to turn off radio functions. In this embodiment, the server may select the mobile device having the highest level of power left in its battery as the first selected mobile device which has to continue providing the location data and proximity information to the server 317 while the remaining mobile devices in the subgroup can shut their radio functions down. In this embodiment, the server 317 receives the location data and proximity information for all the mobile devices in the subgroup from the first selected mobile device.

In another embodiment, the server selects, based on the level of power, another of the mobile devices in the subgroup as a second selected mobile device, and signaling to the mobile devices in the subgroup other than the first and the second selected mobile devices to turn off radio functions. In this embodiment, the server may select the mobile device with the second highest level of power as the second selected mobile device. In this embodiment, the first and second selected mobile device may be used proportionally to their level of power to provide the location data and proximity information to the server. Thus, the server may signal to the first and the second selected mobile devices to shut down their radio functions inversely proportionally to the level of power associated with the first and second selected mobile devices, respectively.

An embodiment of the invention may be a machine-readable medium having stored thereon instructions which program a processor to perform some or all of the operations described above. A machine-readable medium may include any mechanism for storing or transmitting information in a form readable by a machine (e.g., a computer), such as Compact Disc Read-Only Memory (CD-ROMs), Read-Only Memory (ROMs), Random Access Memory (RAM), and Erasable Programmable Read-Only Memory (EPROM). In other embodiments, some of these operations might be performed by specific hardware components that contain hardwired logic. Those operations might alternatively be performed by any combination of programmable computer components and fixed hardware circuit components.

While the invention has been described in terms of several embodiments, those of ordinary skill in the art will recognize that the invention is not limited to the embodiments described, but can be practiced with modification and alteration within the spirit and scope of the appended claims. The description is thus to be regarded as illustrative instead of limiting. There are numerous other variations to different aspects of the invention described above, which in the interest of conciseness have not been provided in detail. Accordingly, other embodiments are within the scope of the claims.

The invention claimed is:

1. A method of conserving battery power of mobile devices within a location-based subgroup comprising:
   registering and linking by a processor included in a tracking server a group of mobile devices to track locations of the mobile devices;
   forming by the processor a location-based subgroup of mobile devices from the registered group of mobile devices based on location data and proximity information received from a first mobile device included in the registered group of mobile devices, the location-based subgroup of mobile devices including mobile devices within a first predetermined radius of a specific location;
   querying and receiving by the processor a level of power associated with each of the mobile devices in the location-based subgroup; and
   transmitting control signals by the processor to each of the mobile devices in the located-based subgroup to conserve battery power of one or more mobile devices in the location-based subgroup, wherein transmitting control signals by the processor includes:
      selecting at least one of the mobile devices in the location-based subgroup having a highest level of power as a first selected mobile device, and
      signaling to the mobile devices in the location-based subgroup other than the first selected mobile device to shut down at least one of radio functions that are used to provide location data or proximity information while tracking a location of each of the mobile devices in the location-based subgroup using a proximity sensor on the first selected mobile device,
      wherein the mobile devices in the location-based subgroup other than the first selected mobile device stop transmitting at least one of the location data or the proximity information provided by the at least one of the radio functions, and
      wherein at least one of the location data or the proximity information from the first selected mobile device respectively includes the location data or the proximity information of each of the mobile devices in the location-based subgroup.

2. The method of claim 1, further comprising:
   determining by the processor if the specific location is included in a database to confirm that the specific location is associated with at least one mobile device in the location-based subgroup of mobile devices; and
   updating the database to associate the specific location with each of the mobile devices in the location-based subgroup of mobile devices.

3. The method of claim 1, wherein transmitting control signals further comprises:
   signaling to each of the mobile devices in the location-based subgroup to shut down at least one of the radio function to provide location data or the radio function to provide proximity information for a length of time inversely proportional to the level of power associated with each of the mobile devices in the location-based subgroup.

4. The method of claim 1, wherein transmitting control signals further comprises:
   selecting another of the mobile devices in the location-based subgroup having a second highest level of power as a second selected mobile device, and signaling to the mobile devices in the location-based subgroup other than the first and the second selected mobile devices to turn off radio functions to provide at least one of the location data or the proximity information.

5. The method of claim 4, wherein transmitting control signals further comprises:
   signaling to the first and the second selected mobile devices to shut down their radio functions to provide at least one of the location data or the proximity information for a length of time inversely proportional to the level of power associated with the first and second selected mobile devices, respectively.

6. The method of claim 1, further comprising:
   querying and receiving by the processor characteristics associated with each of the mobile devices in the location-based subgroup.

7. The method of claim 6, wherein transmitting control signals further comprises:
   identifying mobile devices in the location-based subgroup based on the characteristics received that have low power capability; and
   signaling to the identified mobile devices to shut down at least one of the radio function to provide location data or the function to provide proximity information.

8. The method of claim 1, further comprising:
   receiving, by the processor, location data and proximity information from each of a plurality of mobile devices, respectively, wherein the location data received from a first mobile device included in the plurality of mobile devices includes a location of the first mobile device and the proximity information received from the first mobile device includes an identification of mobile devices that are within a second predetermined radius of the location of the first mobile device, wherein the proximity information received from the first mobile device is generated by a proximity sensor included in the first mobile device.

9. The method of claim 8, further comprising:
   identifying by the processor, based on the location data and the proximity information, the specific location.

10. An apparatus for conserving battery power of mobile devices within a location-based subgroup comprising:
    a processor;
    a communication interface; and
       a memory storage coupled to the processor and the communication interface, the memory storing instructions that, when executed by the processor, causes the processor to:
          register and link a group of mobile devices to track locations of the mobile devices,
          form a location-based subgroup of mobile devices from the registered group of mobile devices based on location data and proximity information received from a first mobile device included in the registered group of mobile devices, the location-based subgroup of mobile devices including mobile devices within a first predetermined radius of a specific location,
 query and receive via the communication interface a level of power associated with each of the mobile devices in the location-based subgroup, and
 transmit control signals via the communication interface to each of the mobile devices in the location-based subgroup to conserve battery power of one or more mobile devices in the location-based subgroup, wherein transmitting control signals includes:
  selecting at least one of the mobile devices in the location-based subgroup having a highest level of power as a first selected mobile device, and
  signaling to the mobile devices in the location-based subgroup other than the first selected mobile device to shut down at least one of radio functions that are used to provide location data or proximity information while tracking a location of each of the mobile devices in the location-based subgroup using a proximity sensor on the first selected mobile device,
  wherein the mobile devices in the location-based subgroup other than the first selected mobile device stop transmitting at least one of the location data or the proximity information provided by the at least one of the radio functions, and
  wherein at least one of the location data or the proximity information from the first selected mobile device respectively includes the location data or the proximity information of each of the mobile devices in the location-based subgroup.

11. The apparatus of claim 10 further comprising:
 a database storing historical data including location data associated with a plurality of mobile devices,
 wherein, when the processor executes the instructions stored in memory, the processor further:
  determines if the specific location is included in the database to confirm that the specific location is associated with at least one mobile device in the location-based subgroup of mobile devices, and
  updates the database to associate the specific location with each of the mobile devices in the location-based subgroup of mobile devices.

12. The apparatus of claim 10, wherein transmitting control signals further comprises:
 signaling via the communication interface to each of the mobile devices in the location-based subgroup to shut down at least one of the radio function to provide the location data or the radio function to provide the proximity information for a length of time inversely proportional to the level of power associated with each of the mobile devices in the location-based subgroup.

13. The apparatus of claim 10, wherein transmitting control signals further comprises:
 selecting another of the mobile devices in the location-based subgroup having a second highest level of power as a second selected mobile device, and
 signaling via the communication interface to the mobile devices in the location-based subgroup other than the first and the second selected mobile devices to turn off at least one of the radio function to provide the location data or the radio function to provide the proximity information.

14. The apparatus of claim 13, wherein transmitting control signals further comprises:
 signaling via the communication interface to the first and the second selected mobile devices to shut down at least one of the radio function to provide the location data or the radio function to provide the proximity information for a length of time inversely proportional to the level of power associated with the first and second selected mobile devices, respectively.

15. The apparatus of claim 10 wherein, when the processor executes the instructions stored in memory, the processor further:
 sends via the communication interface a second query to one of the mobile devices in the location-based subgroup having an active function to provide the location data and the proximity information, the second query requesting a subgroup location data that is associated with each of the mobile devices in the location-based subgroup.

16. The apparatus of claim 10, wherein, when the processor executes the instructions stored in memory, the processor further:
 sends via the communication interface a query for characteristics associated with each of the mobile devices in the location-based subgroup.

17. The apparatus of claim 16, wherein transmitting control signals further comprises:
 identifying mobile devices in the location-based subgroup based on the characteristics received that have low power capability; and
 signaling via the communication interface to the identified mobile devices to shut down at least one of the function to provide location data or the function to provide proximity information.

18. A non-transitory computer-readable medium having stored thereon instructions that, when executed by a processor, causes the processor to perform a method for conserving battery power of mobile devices within a location-based subgroup, the method comprising:
 registering and linking by a processor included in a tracking server a group of mobile devices to track locations of the mobile devices;
 forming a location-based subgroup of mobile devices from the registered group of mobile devices based on location data and proximity information received from a first mobile device included in the registered group of mobile devices, the location-based subgroup of mobile devices including mobile devices within a first predetermined radius of a specific location;
 querying and receiving level of power associated with each of the mobile devices in the location-based subgroup; and
 transmitting control signals to each of the mobile devices in the location-based subgroup to conserve battery power of one or more mobile devices in the location-based subgroup, wherein transmitting control signals includes:
  selecting at least one of the mobile devices in the location-based subgroup having a highest level of power as a first selected mobile device, and
  signaling to the mobile devices in the location-based subgroup other than the first selected mobile device to shut down at least one of radio functions that are used to provide location data or proximity information while tracking a location of each of the mobile devices in the location-based subgroup using a proximity sensor on the first selected mobile device, wherein the mobile devices in the location-based subgroup other than the first selected mobile device stop transmitting at least one of the location data or the proximity information provided by the at least one of the radio functions, and wherein at least one of the location data or the proximity information from the first selected mobile device respectively includes the location data or the proximity information of each of the mobile devices in the subgroup.

19. The non-transitory computer-readable medium of claim 18, having instructions that, when executed by the processor, causes the processor to perform a method further comprising:

determining if the specific location is included in a database to confirm that the specific location is associated with at least one mobile device in the location-based subgroup of mobile devices; and updating the database to associate the specific location with each of the mobile devices in the location-based subgroup of mobile devices.

20. The non-transitory computer-readable medium of claim 18, wherein transmitting control signals further comprises:

signaling to each of the mobile devices in the location-based subgroup to shut down at least one of the radio function to provide the location data or the radio function to provide the proximity information for a length of time inversely proportional to the level of power associated with each of the mobile devices in the location-based subgroup.

21. The non-transitory computer-readable medium of claim 18, having instructions that, when executed by the processor, causes the processor to perform a method further comprising:

querying and receiving characteristics associated with each of the mobile devices in the location-based subgroup.

22. The non-transitory computer-readable medium of claim 21, wherein transmitting control signals further comprises:

identifying mobile devices in the location-based subgroup based on the characteristics received that have low power capability; and signaling to the identified mobile devices to shut down at least one of the radio function to provide the location data or the radio function to provide the proximity information.

* * * * *